US012646348B2

(12) United States Patent
Luczak et al.

(10) Patent No.: US 12,646,348 B2
(45) Date of Patent: Jun. 2, 2026

(54) DEVICE AND METHOD FOR DETECTING PEOPLE IN VIDEO DATA USING NON-VISUAL SENSOR DATA

(71) Applicant: MOTOROLA SOLUTIONS, INC., Chicago, IL (US)

(72) Inventors: Lukasz Luczak, Skawina (PL); Jakub Baranski, Cracow (PL); Grzegorz Szurek, Cracow (PL); Dominika Dubowik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 438 days.

(21) Appl. No.: 18/045,930

(22) Filed: Oct. 12, 2022

(65) Prior Publication Data

US 2024/0127619 A1     Apr. 18, 2024

(51) Int. Cl.
G06V 40/10     (2022.01)
G06F 3/14     (2006.01)
(Continued)

(52) U.S. Cl.
CPC .............. G06V 40/103 (2022.01); G06F 3/14 (2013.01); G06T 5/77 (2024.01); G06V 10/26 (2022.01);
(Continued)

(58) Field of Classification Search
CPC .. G06V 40/103; G06V 10/26; G06V 2201/07; G06V 20/52; G06V 20/53;
(Continued)

(56) References Cited

U.S. PATENT DOCUMENTS

| | | | |
|---|---|---|---|
| 9,774,790 B1 | 9/2017 | Kussel | |
| 10,242,282 B2 * | 3/2019 | Loce ...................... | G06V 20/70 |
| 10,867,217 B1 * | 12/2020 | Madden ............... | G06V 10/764 |
| 11,120,675 B2 * | 9/2021 | Lin ........................... | G06T 7/11 |
| 11,321,592 B2 * | 5/2022 | Hu ........................ | A61B 5/1113 |
| 11,602,132 B2 * | 3/2023 | Spears ................. | A01K 29/005 |

(Continued)

FOREIGN PATENT DOCUMENTS

CN          113225526 A   *   8/2021   ......... G06K 9/00771

OTHER PUBLICATIONS

The International Search Report and the Written Opinion, corresponding patent application No. PCT/US2023/033582, filed: Sep. 25, 2023, mailed Jan. 22, 2024, all pages.

*Primary Examiner* — Matthew C Bella
*Assistant Examiner* — Nicholas John Helco
(74) *Attorney, Agent, or Firm* — Raguraman Kumaresan

(57) ABSTRACT

A process for detecting people in video data using non-visual sensor data. An electronic computing device obtains video data captured by a camera during a time period and analyzes the video data with a video analytics engine to detect a number of persons visible in a field of view (FOV) depicted by the video data. The electronic computing device obtains non-visual sensor data that was captured by a non-visual sensor associated with the FOV during the time period and detects a feature in the non-visual sensor data that indicates that an additional person not detected with the video analytics engine was likely present in the FOV depicted by the video data during the time period. The electronic computing device provides an electronic notification indicating that an additional person not detected with the video analytics engine was likely present in the FOV depicted by the video data during the time period.

20 Claims, 6 Drawing Sheets

<u>300</u>

310 — OBTAIN VIDEO DATA CAPTURED BY A CAMERA DURING A TIME PERIOD

320 — ANALYZE THE VIDEO DATA WITH A VIDEO ANALYTICS ENGINE TO DETECT A NUMBER OF PERSONS VISIBLE IN A FIELD OF VIEW (FOV) DEPICTED BY THE VIDEO DATA

330 — OBTAIN NON-VISUAL-SENSOR DATA THAT WAS CAPTURED BY A NON-VISUAL SENSOR ASSOCIATED WITH THE FOV DURING THE TIME PERIOD

340 — DETECT A FEATURE IN THE NON-VISUAL-SENSOR DATA THAT INDICATES THAT AN ADDITIONAL PERSON NOT DETECTED WITH THE VIDEO ANALYTICS ENGINE WAS LIKELY PRESENT IN THE FOV DEPICTED BY THE VIDEO DATA DURING THE TIME PERIOD

350 — PROVIDE AN ELECTRONIC NOTIFICATION INDICATING THAT AN ADDITIONAL PERSON NOT DETECTED WITH THE VIDEO ANALYTICS ENGINE WAS LIKELY PRESENT IN THE FOV DEPICTED BY THE VIDEO DATA DURING THE TIME PERIOD

(51) Int. Cl.
G06T 5/77 (2024.01)
G06V 10/26 (2022.01)

(52) U.S. Cl.
CPC .............. *G06T 2207/30196* (2013.01); *G06T 2207/30242* (2013.01); *G06V 2201/07* (2022.01)

(58) Field of Classification Search
CPC .............. G06V 2201/10; G06V 40/10; G06V 30/2552; G06V 10/803; G06F 3/14; G06F 18/256; G06T 5/77; G06T 2207/30196; G06T 2207/30242; G06T 2207/30168; G06T 2207/30201; G06T 3/4061
See application file for complete search history.

(56) References Cited

U.S. PATENT DOCUMENTS

| | | | |
|---|---|---|---|
| 12,499,683 B1 * | 12/2025 | Thanikachalam ..... | G06V 20/44 |
| 2010/0238286 A1 * | 9/2010 | Boghossian ........... | H04N 7/188 |
| | | | 348/143 |
| 2016/0119553 A1 | 4/2016 | Alm et al. | |
| 2018/0200745 A1 * | 7/2018 | Dudar ................... | B05B 12/004 |
| 2019/0332901 A1 | 10/2019 | Doumbouya et al. | |
| 2019/0348076 A1 * | 11/2019 | Hershfield ............. | H04N 7/186 |
| 2021/0004606 A1 * | 1/2021 | Se ........................... | G06V 20/52 |
| 2021/0103781 A1 * | 4/2021 | Vigren ................. | G06N 3/0464 |
| 2021/0271895 A1 | 9/2021 | Chen et al. | |

* cited by examiner

_100_

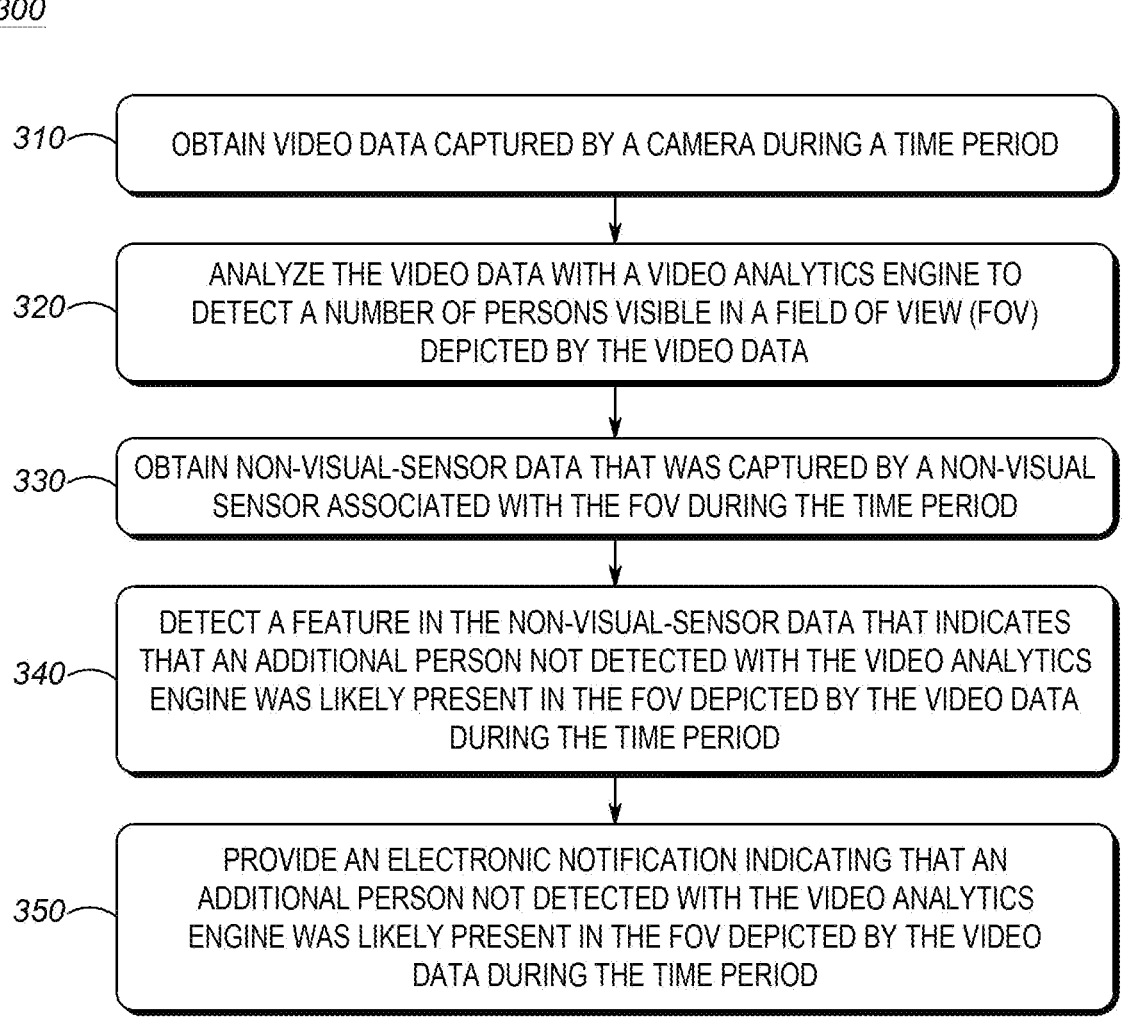

_300_

310 — OBTAIN VIDEO DATA CAPTURED BY A CAMERA DURING A TIME PERIOD

320 — ANALYZE THE VIDEO DATA WITH A VIDEO ANALYTICS ENGINE TO DETECT A NUMBER OF PERSONS VISIBLE IN A FIELD OF VIEW (FOV) DEPICTED BY THE VIDEO DATA

330 — OBTAIN NON-VISUAL-SENSOR DATA THAT WAS CAPTURED BY A NON-VISUAL SENSOR ASSOCIATED WITH THE FOV DURING THE TIME PERIOD

340 — DETECT A FEATURE IN THE NON-VISUAL-SENSOR DATA THAT INDICATES THAT AN ADDITIONAL PERSON NOT DETECTED WITH THE VIDEO ANALYTICS ENGINE WAS LIKELY PRESENT IN THE FOV DEPICTED BY THE VIDEO DATA DURING THE TIME PERIOD

350 — PROVIDE AN ELECTRONIC NOTIFICATION INDICATING THAT AN ADDITIONAL PERSON NOT DETECTED WITH THE VIDEO ANALYTICS ENGINE WAS LIKELY PRESENT IN THE FOV DEPICTED BY THE VIDEO DATA DURING THE TIME PERIOD

_FIG. 3_

*500*

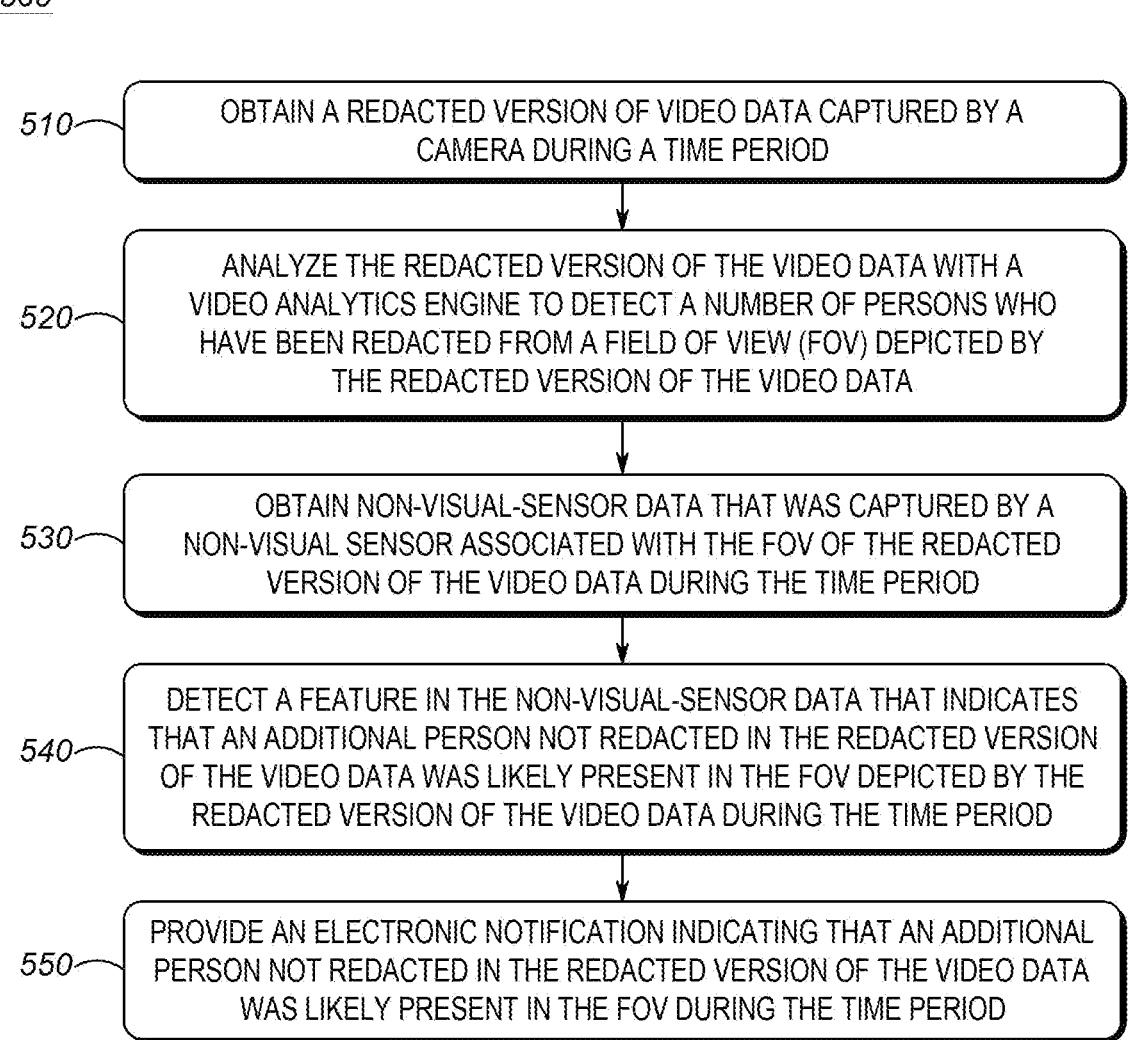

510 — OBTAIN A REDACTED VERSION OF VIDEO DATA CAPTURED BY A CAMERA DURING A TIME PERIOD

520 — ANALYZE THE REDACTED VERSION OF THE VIDEO DATA WITH A VIDEO ANALYTICS ENGINE TO DETECT A NUMBER OF PERSONS WHO HAVE BEEN REDACTED FROM A FIELD OF VIEW (FOV) DEPICTED BY THE REDACTED VERSION OF THE VIDEO DATA

530 — OBTAIN NON-VISUAL-SENSOR DATA THAT WAS CAPTURED BY A NON-VISUAL SENSOR ASSOCIATED WITH THE FOV OF THE REDACTED VERSION OF THE VIDEO DATA DURING THE TIME PERIOD

540 — DETECT A FEATURE IN THE NON-VISUAL-SENSOR DATA THAT INDICATES THAT AN ADDITIONAL PERSON NOT REDACTED IN THE REDACTED VERSION OF THE VIDEO DATA WAS LIKELY PRESENT IN THE FOV DEPICTED BY THE REDACTED VERSION OF THE VIDEO DATA DURING THE TIME PERIOD

550 — PROVIDE AN ELECTRONIC NOTIFICATION INDICATING THAT AN ADDITIONAL PERSON NOT REDACTED IN THE REDACTED VERSION OF THE VIDEO DATA WAS LIKELY PRESENT IN THE FOV DURING THE TIME PERIOD

*FIG. 5*

DEVICE AND METHOD FOR DETECTING PEOPLE IN VIDEO DATA USING NON-VISUAL SENSOR DATA

BACKGROUND

Organizations such as public safety agencies and private enterprises capture and process large amounts of video. The video is often processed to identify persons of interest for investigation or record purposes. Sometimes agencies release video on public platforms (e.g., social media, press etc.) to provide transparency into their investigation or to seek information about persons or events of interest captured in the video. Prior to releasing the video on public platforms, the video is often redacted to protect the identity of individuals captured in the images but are not of interest for investigation or record purposes. However, identifying people in the video for investigation or redaction purposes might be challenging in some situations when the video has a low resolution or not clear due to weather or environmental conditions existing in the location where the video was captured.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 3 illustrates a flowchart of a process for detecting people in video data using non-visual sensor data in accordance with some embodiments.

FIG. 5 illustrates a flowchart of a process for detecting people in video data using non-visual sensor data in accordance with some embodiments.

Figure 1:
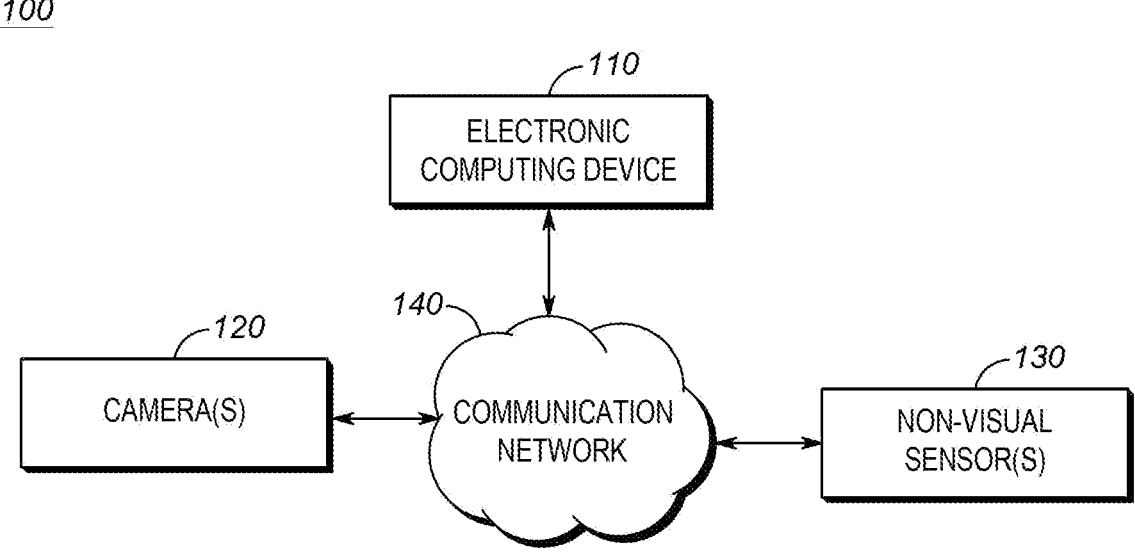
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, agencies often process video owned/captured by them for investigation or redaction purposes. The videos may be processed manually using a human operator or automatically using a computer running a video analytics engine to identify persons, objects, or events of interest. Whether the video is processed manually or automatically, it is possible for a human operator or a video analytics engine to overlook a person captured in the image, for example, due to the video being captured with a low resolution, the scene captured in the video being dark or obscured by smoke, dust, fog, or some other physical objects, or simply due to a human or computation error. When the video is subsequently released for public viewing, the person who was overlooked during the processing of the video might not have been redacted in the video. It is possible for a member of the public to perform video adjustments on a redacted video available in a public platform to identify persons who were overlooked during the redaction process. This may further compromise the privacy of the persons who were not redacted in the publicly released video. Accordingly, disclosed below is an improved system and process for detecting people in video data using non-visual sensor data. The improved system and process would ensure detection of any person who has been overlooked during video processing for investigation or redaction purposes.

One embodiment provides a method for detecting people in video data using non-visual sensor data. The method comprises: obtaining, at an electronic computing device, video data captured by a camera during a time period; analyzing, at the electronic computing device, the video data with a video analytics engine to detect a number of persons visible in a field of view (FOV) depicted by the video data; obtaining, at the electronic computing device, non-visual sensor data that was captured by a non-visual sensor associated with the FOV during the time period; detecting, at the electronic computing device, a feature in the non-visual sensor data that indicates that an additional person not detected with the video analytics engine was likely present in the FOV depicted by the video data during the time period; providing, at the electronic computing device, an electronic notification indicating that an additional person not detected with the video analytics engine was likely present in the FOV depicted by the video data during the time period.

Another embodiment provides an electronic computing device including a communications unit and an electronic processor communicatively coupled to the communications unit. The electronic processor is configured to: obtain, via the communications unit, video data captured by a camera during a time period; analyze the video data with a video analytics engine to detect a number of persons visible in a field of view (FOV) depicted by the video data; obtain non-visual sensor data that was captured by a non-visual sensor associated with the FOV during the time period; detect a feature in the non-visual sensor data that indicates that an additional person not detected with the video analytics engine was likely present in the FOV depicted by the video data during the time period; and provide an electronic notification indicating that an additional person not detected with the video analytics engine was likely present in the FOV depicted by the video data during the time period.

A further embodiment provides a method for detecting people in video data using non-visual sensor data. The method comprises: obtaining, at an electronic computing device, a redacted version of video data captured by a camera during a time period; analyzing, at the electronic computing device, the redacted version of the video data through a video analytics engine to detect a number of persons who have been redacted from a field of view (FOV) depicted by the redacted version of the video data; obtaining, at the electronic computing device, non-visual sensor data that was captured by a non-visual sensor associated with the FOV of the redacted version of the video data during the time period; detecting, at the electronic computing device, a feature in the non-visual sensor data that indicates that an additional person not redacted in the redacted version of the video data was likely present in the FOV during the time period; and providing, at the electronic computing device, an electronic notification indicating that an additional person not redacted in the redacted version of the video data was likely present in the FOV during the time period.

Each of the above-mentioned embodiments will be discussed in more detail below, starting with example system and device architectures of the system in which the embodiments may be practiced, followed by an illustration of processing blocks for achieving an improved technical method, device, and system for a method for detecting people in video data using non-visual sensor data. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an electronic computing device 110, one or more cameras 120, and one or more non-visual sensors 130. The electronic computing device 110 is any computing device configured to detect people in video data captured by one or more cameras 120 using non-visual sensor data obtained from one or more non-visual sensors 130. The video data captured by the one or more cameras 120 may be maintained by one or more agencies in one or more databases (not shown) that are accessible to the electronic computing device 110. An agency is an organizational entity that may store, retrieve, and/or process various types of electronic records (e.g., video data) related to the organization's goals, activities, resources, and the like. In some embodiments, an agency may represent a private enterprise organization such as press, media, utilities, retail, healthcare, manufacturing, oil/gas, electric, private security, or other business. In other embodiments, an agency may represent a public organization such as a public-safety agency (e.g., police, fire, emergency medical service), governmental entity (e.g., court, city administration), and the like. The agencies may employ one or more computing devices (e.g., electronic computing device 110) that are configured to perform computing functions on behalf of agencies such as receiving, storing, processing, and sharing video data captured by the one or more cameras 120. The cameras 120 may include, but not limited to surveillance cameras, vehicle cameras, body-worn cameras, mobile device cameras, and drone cameras that may be controlled and/or owned by the agencies. The video data captured by cameras 120 that are owned and/or controlled by a particular agency may be referred herein as video data owned by the particular agency or associated with the particular agency. In some embodiments, the video data may include still and/or moving images. Further, the video data may include video or images captured corresponding to a reported incident. As used herein, the term "incident" may refer to an event, occurrence, or situation that an agency has been tasked to resolve (e.g., a traffic accident, public disturbance, medical emergency, fire, broken water meter or power line, etc.).

The one or more non-visual sensors 130 may include, but not limited to, a Bluetooth Low-Energy (BLE) beacon, a weight sensor, a Global Positioning System (GPS), a Wireless Fidelity (WiFi) Positioning System (WPS), an Ultra-Wideband (UWB) positioning system, a laser perimeter sensor, a radar, a Light Detection and Ranging (LiDar) sensor, a fiber optic detection system, an electrostatic field disturbance sensor, a spot vibration sensor, a passive infrared (PIR) sensor, a motion sensor, an active ultrasonic sensor, a temperature sensor, a microwave motion sensor, a window sensor, a door sensor, a capacitive sensor, or a seismic sensor. In accordance with embodiments, the electronic computing device 110 has access to non-visual sensor data captured by the non-visual sensors 130. The non-visual sensors 130 may be deployed in the same location as the cameras 120. Accordingly, when the electronic computing device 110 executes a process (e.g., process 300, 500) to detect people in video data, the electronic computing device 110 obtains non-visual sensor data captured by the non-visual sensors 130 during a similar time period as the video data was captured by the cameras 120. In accordance with some embodiments, the cameras 120 and the non-visual sensors 130 are deployed in proximity to each other or in other words have a same or similar field-of-view. In some embodiments, the cameras 120 and the non-visual sensors 130 may be implemented within the same device.

The electronic computing device 110 communicates with the cameras 120 and the non-visual sensors 130 via one or more communication networks 140. For example, the electronic computing device 110 obtains video data captured by the camera(s) 120 and non-visual sensor data captured by the non-visual sensor(s) 130 via the communication network 140. The communication network 140 includes wireless and wired connections. For example, the communication network 140 may be implemented using a wide area network, such as the Internet, a local area network, such as a Wi-Fi network, and personal area or near-field networks, for example a Bluetooth™ network. Portions of the communications network 140 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

While only a single electronic computing device 110 is shown as being included in the system 100, the system 100 may include any number of electronic computing devices, where each electronic computing device may be controlled by one or more agencies to execute the process of detecting people in video data using non-visual sensor data and to further ensure would ensure detection of any person who has been overlooked during video processing for investigation or redaction purposes.

Figure 2:
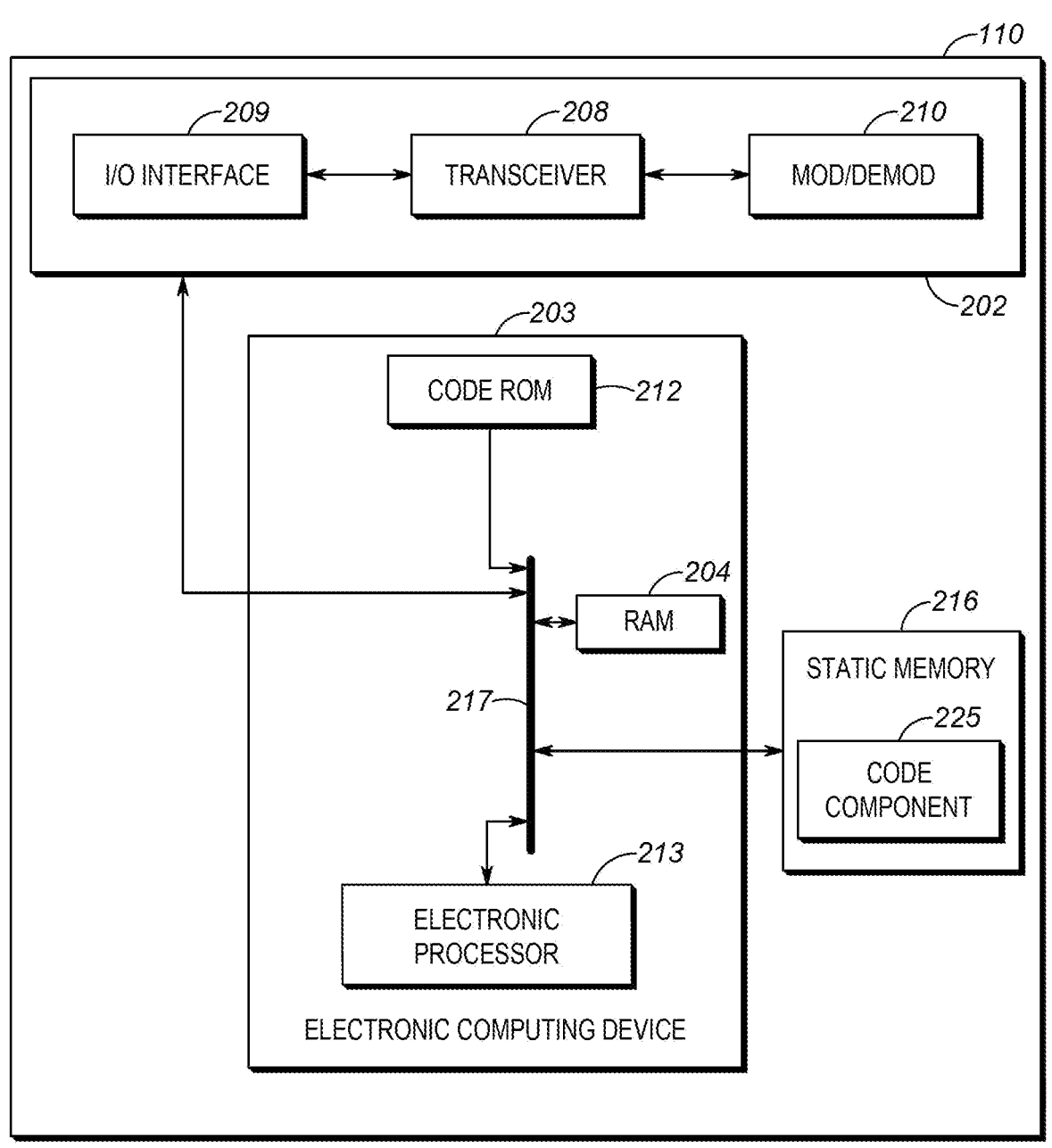
FIG. 2 is a block diagram of an electronic computing device shown in FIG. 1 in accordance with some embodiments.

FIG. 2 is an example functional block diagram of an electronic computing device 110 operating within the system 100 in accordance with some embodiments. The electronic computing device 110 may be embodied in computing devices not illustrated in FIG. 1, and/or may be a distributed computing device across two or more of the foregoing (or multiple of a same type of one of the foregoing) and linked via a wired and/or wireless communication link(s). While FIG. 2 represents an electronic computing device 110 described above with respect to FIG. 1, depending on the type of server, the electronic computing device 110 may include fewer or additional components in configurations different from that illustrated in FIG. 2. For example, the electronic computing device 110 may additionally include an electronic display (not shown) for presenting an electronic notification indicating people (including people who were overlooked during a manual or automated processing of video data) detected in video data using non-visual sensor data.

As shown in FIG. 2, the electronic computing device 110 includes a communications unit 202 (also referred to as a "communication interface") coupled to a common data and address bus 217 of a processing unit 203. The communications unit 202 sends and receives data to and from other devices in the system 100. The communications unit 202 may include one or more wired and/or wireless input/output (I/O) interfaces 209 that are configurable to communicate with other devices in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202.

Static memory 216 may store operating code 225 for the electronic processor 213 that, when executed, performs one or more of the blocks set forth in FIGS. 3 and 5, and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 216 may further store information required for the electronic computing device 110 to obtain video data captured by a camera 120 during a time period, analyze the video data to detect a number of persons visible in a field of view (FOV) depicted by the video data, obtain non-visual sensor data that was captured by a non-visual sensor 130 associated with the FOV during the time period, detect a feature in the non-visual sensor data that indicates that an additional person not detected through the video analytics engine was likely present in the FOV depicted by the video data during the time period, and provide an electronic notification indicating that an additional person not detected during analysis of the video was likely present in the FOV depicted by the video data during the time period. As an example, the static memory 216 stores the video data obtained from the camera 120 along with metadata (e.g., time and location of capture) of the video data. The static memory 216 may further store the non-visual sensor data obtained from the non-visual sensor 130 along with metadata (e.g., time and location of capture) of the non-visual sensor data. The static memory 216 may further store a count of people respectively detected from the video data and the non-visual sensor data.

In accordance with some embodiments, when the video data obtained from the camera 120 is processed using a video analytics engine, the electronic computing device 110 further stores operating code associated with the video analytics engine for analyzing the video data obtained from the camera 120 and for detecting a number of persons visible in a field-of-view depicted by the video data. In these embodiments, the video analytics engine may include one or more object classifiers that may be particularly trained to identify an instance of a person or an object visible in the FOV of the video data.

Turning now to FIG. 3, a flowchart diagram illustrates a process 300 for detecting people in video data using non-visual sensor data. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 213.

The electronic computing device 110 may execute the process 300 at power-on, at some predetermined periodic time period thereafter, in response to a trigger raised locally at the electronic computing device 110 via an internal process or via an input interface or in response to a trigger from an external device (e.g., a computing device associated with an agency) to which the electronic computing device 110 is communicably coupled, among other possibilities. As an example, the electronic computing device 110 is programmed to automatically trigger execution of the process 300 when a request to detect people in video data is received from an agency, for example, via a computing device associated with the agency.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well. The process 300 will be described below with reference to an example user interface 400 shown in FIG. 4, where the user interface 400 can be used to present an electronic notification 430 indicating detection of one or more additional persons (i.e., persons who might have been overlooked by a human operator or a video analytics engine during processing of video data) in the video data.

At block 310, the electronic computing device 110 obtains video data captured by a camera 120 during a time period. As shown in the example illustrated in FIG. 4, the electronic computing device 110 may obtain video data 410 from the camera 120 and further presents the video data for playback on a user interface 400. In accordance with some embodiments, the electronic computing device 110 may receive a request for detecting people depicted by the video data 410 from a computing device associated with an agency via the communication network 140. The request may include an identifier that uniquely identifies the video data 410 (e.g., an image or a video). The request may further include one or more of: agency information (e.g., name of agency, location of agency, agency credential etc.) identifying the agency, an identifier of the camera 120 which captured the video data 410, a time period during which the video data was captured by the camera 120, and a location at which the video data 410 was captured by the camera 120, an identifier (e.g., a computer aided dispatch identifier) identifying an incident corresponding to which the video data 410 was captured, location of the incident, type of incident, etc. In some embodiments, the request may additionally include a copy of the video data 410. In other embodiments, the electronic computing device 110 retrieves a copy of the video data 410 using the identifier of the video data 410 included in the request by accessing one or more databases which are configured to store video data owned by the agency.

At block 320, the electronic computing device 110 analyzes the video data with a video analytics engine to detect a number of persons visible in a field-of-view (FOV) depicted by the video data. For example, the video analytics engine may include one or more object or feature classifiers that may be particularly trained to identify an instance of a person or more particularly to identify any segment or a pixel range within the image that reveals facial and/or non-facial features which can be used to detect the presence of one or more persons within the FOV depicted by the video data. The electronic computing device 110 may further present an electronic notification identifying a list of persons who were detected within the FOV of the video data by the video analytics engine. If the video analytics engine further identifies the identity of a person (e.g., by recognizing the unique facial features of a person) visible in the FOV of the video data, then the video analytics engine indicates not only the presence of the person in the video data, but also the identity (e.g., person's name) of the person. In the example shown in FIG. 4, the electronic computing device 110 has analyzed the video data 410 with a video analytics engine to detect persons 412, 414, and 416 who were visible in the FOV depicted by the video data 410. Accordingly, the electronic computing device 110 presents an electronic notification 420 indicating that persons 412, 414, and 416 are visible in the FOV of the video data. In addition, when the electronic computing device 110 identifies the identity of person 416, the electronic computing device 110 additionally provides information 422 regarding the identity (e.g., name, role, associated agency etc.) of person 416. Further, with respect to the persons 412, 414 who were detected to be visible in the FOV depicted by the video data 410, the electronic computing device 110 may provide information 424, 426 indicating that their identity is unknown. In one embodiment, the electronic computing device 110 may additionally or alternatively receive a user input (e.g., from a human operator performing a redaction on the video data) regarding the number of persons visible in the FOV depicted by the video data.

At block 330, the electronic computing device 110 obtains non-visual sensor data that was captured by a non-visual sensor 130 associated with the FOV during the time period. In accordance with some embodiments, the electronic computing device 110 transmits an electronic request to the non-visual sensor 130 to obtain the non-visual sensor data. The electronic request transmitted to the non-visual sensor 130 may include information related to one or more of the time period (i.e., time at which the camera 120 captured the video data), location (location at which the camera 120 captured the video data), and FOV depicted by the video data. The non-visual sensor 130, in response, processes the electronic request and transmits non-visual sensor data captured by the non-visual sensor relative to the time period, location, and FOV of the video data. The electronic computing device 110 is programmed to obtain non-visual sensor data each time a process to detect people in video data is performed. Alternatively, the electronic computing device 110 executes block 330 to additionally rely on non-visual sensor data to detect people in video data only when one or more of predetermined conditions, as described below, are satisfied.

In one embodiment, prior to obtaining the non-visual sensor data, the electronic computing device 110 determines whether a measure of video quality of the video data captured by the camera 120 is less than a video quality threshold. For example, the electronic computing device 110 computes a measure of the video quality based on the analysis of one or more video features that are extracted from the video captured by the camera 120. The video features that are analyzed include, but not limited to: resolution, camera motion, bad exposure, frame sharpness, out-of-focus detection, brightness (e.g., due to lens flare), overexposure on certain regions of captured image, illumination, noisy frame detection, color temperature, shaking and rotation, blur, edge, scene composition etc. The electronic computing device 110 may compute a measure of video quality based on one or more of the analyzed video features. In one embodiment, the video features extracted from the captured video can be quantized and normalized to compute a measure of the video quality with a range of values, for example, between '0' and '10', where the value of '0' indicates a low video quality and the value of '10' indicates a high video quality. In this embodiment, if the measure of video quality is not less than a predefined video quality threshold, then the electronic computing device 110 may not execute block 330 to obtain non-visual sensor data. On the other hand, if the measure of video quality is less than the predefined video quality threshold, then the electronic computing device 110 further obtains non-visual sensor data from the non-visual sensor 130 to determine whether any additional person not detected with the video analytics engine is present in the FOV depicted by the video data during the same time period when the video data was captured.

In another embodiment, prior to obtaining the non-visual sensor data, the electronic computing device 110 obtains information regarding environmental and/or weather conditions in relation to the video data captured by the camera 120. In this embodiment, the information obtained regarding environmental and/or weather conditions at a location where the image was captured and further during a time period when the image was captured may indicate that a scene include in the video data may not be sufficiently clear due to one or more of: the scene being dark or the scene being obscured because of smoke, dust, fog, rain, or other environmental or weather factors. In this case, when it is determined that the scene captured in the video data is not sufficiently clear due to the environmental and/or weather conditions existing at a particular location (e.g., location where the camera 120 was deployed) during the time period when the video data was captured, the electronic computing device 110 further obtains non-visual sensor data to determine whether any additional person not detected with the video analytics engine is present in the FOV depicted by the video data during the same time period when the video data was captured. The electronic computing device 110 then transmits an electronic request to the non-visual sensor 130 to obtain the non-visual sensor data.

In another embodiment, prior to obtaining the non-visual sensor data, the electronic computing device 110, additionally or alternatively, applies a computer-vision technique to the video data to determine a degree of obscuration of the FOV depicted by the video data captured by the camera 120. If the electronic computing device 110 determines that the degree of obscuration satisfies a predetermined condition, then the electronic computing device 110 transmits an electronic request to the non-visual sensor 130 to obtain the non-visual sensor data.

In another embodiment, prior to obtaining the non-visual sensor data, the electronic computing device 110 obtains additional sensor data captured by one or more of a smoke detector, a fog detector, or a light detector during the time period when the video data was captured by the camera 120. The electronic computing device 110 then determines a degree of obscuration of the FOV based on the additional sensor data. If the degree of obscuration satisfies a predefined condition, then the electronic computing device 110 transmits an electronic request to the non-visual sensor 130 for the non-visual sensor data.

In any case, after the electronic computing device 110 obtains non-visual sensor data captured by one or more non-visual sensors 130, the electronic computing device 110 proceeds to block 340 to detect a feature in the non-visual sensor data that indicates that an additional person not detected with the video analytics engine was likely present in the FOV depicted by the video data during the time period. In one embodiment, the electronic computing device 110 may parse the non-visual sensor data such as cellular network logs, Bluetooth beacons, door access logs, presence and movement detectors data, GPS data, or any other source of location data to detect the presence of an additional person (i.e., a person not detected using the video analytics engine) in the FOV depicted by the video data during the time period. As an example, the electronic computing device 110 may parse cellular logs to detect a feature indicating a number of subscriber devices that were operating within the FOV of the video data during the same time period when the video data was captured. In this case, the electronic computing device 110 may compare the number of subscriber devices detected from the cellular logs with the number of persons detected by the video analytics engine as being visible in the FOV depicted by the video data. If the number of subscriber devices detected from the cellular logs is more than the number of persons detected from the video data, then the electronic computing device 110 determines that an additional person not detected with the video analytics engine was likely present in the FOV depicted by the video data during the same time period when the video data was captured by the camera 120. The electronic computing device 110 may, additionally or alternatively, parse Bluetooth beacons, presence and movement detectors data, door access logs, GPS data, or any other source of location data to similarly determine that an additional person not detected with the video analytics engine was likely present in the FOV depicted by the video data during the same time period when the video data was captured by the camera 120.

Figure 4:
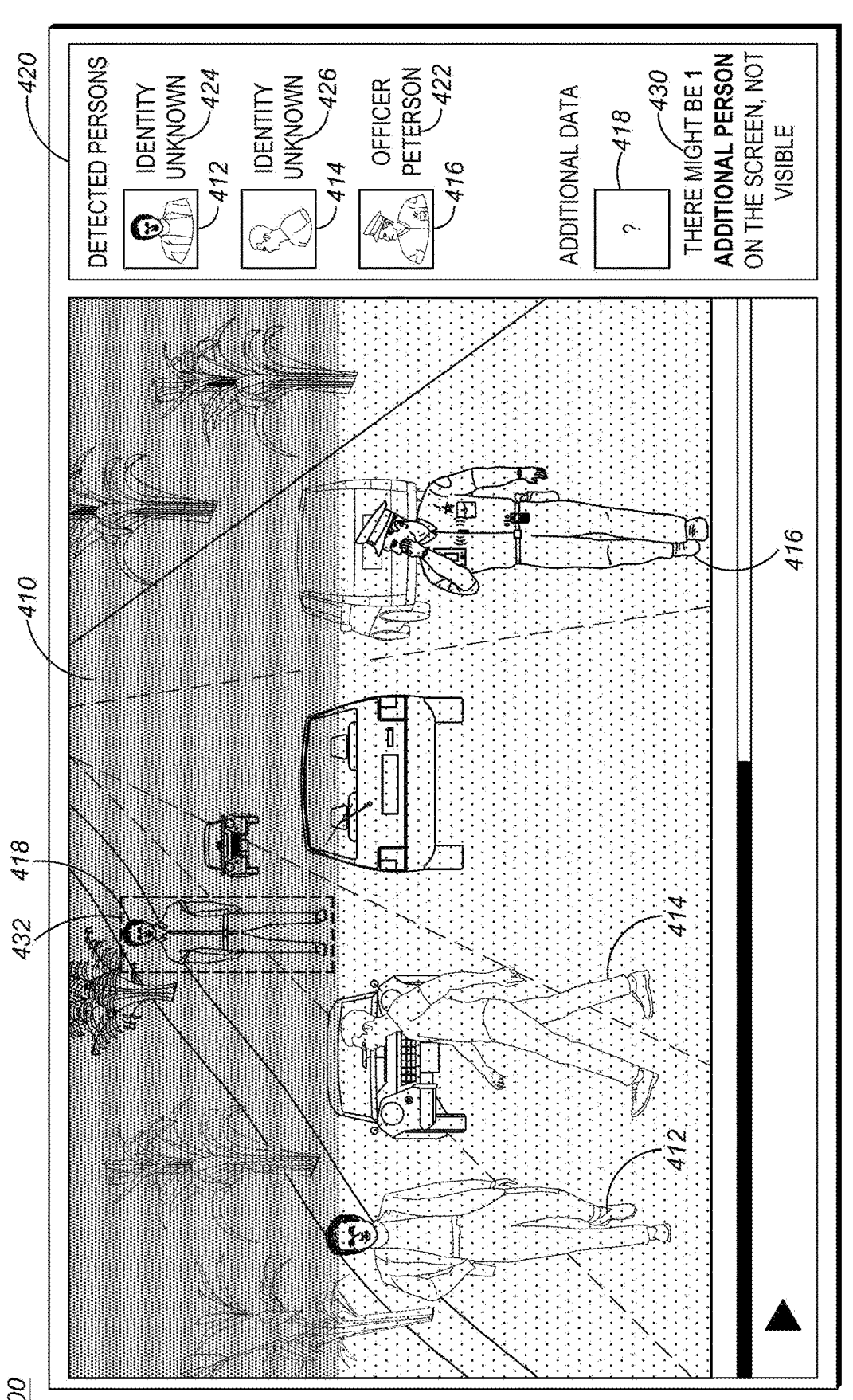
FIG. 4 shows an example user interface for presenting an electronic notification indicating that an additional person detected with a video analytics engine was likely present in a field-of-view depicted by video data.

In the example shown in FIG. 4, the electronic computing device 110 may analyze the non-visual sensor data such as Bluetooth beacons, presence and movement detectors data, door access logs, GPS data, or any other source of location data to detect that an additional person 418 not detected with the video analytics engine was likely present in the FOV depicted by the video data 410 during the time period. In this example, the video analytics engine (or a human operator) might have overlooked the presence of an additional person 418 in the video data due to the scene being obscured by dust particles.

Next, at block 350, the electronic computing device 110 provides an electronic notification indicating that an additional person not detected with the video analytics engine was likely present in the FOV depicted by the video data during the time period when the video data was captured. In the example shown in FIG. 4, the electronic computing device 110 presents an electronic notification 430 on the user interface 400 to indicate that there might be an additional person (e.g., person 418 obscured by the dust particles) present on the video data 410 being played back on the user interface screen. In one embodiment, the electronic computing device 110 identifies a location of the additional person based on the non-visual sensor data, maps the location of the additional person to a pixel range (or frame) within the video data, and further inserts an indication of the pixel range into the electronic notification. In another embodiment, the electronic computing device 110 may render, on an electronic display, an image that illustrates the FOV of the video data 410 as captured by the camera 120 during the time period. In this embodiment, the electronic computing device 110 further renders, on the electronic display, a visual element that identifies the pixel range in the image. In the example shown in FIG. 4, the electronic computing device 110 renders a visual element 432 by highlighting a pixel range in which the additional person 418 is likely expected to be present within the image associated with the video data 410.

In one embodiment, the non-visual sensor 130 is included in an electronic device (e.g., a cellular phone, a Bluetooth Tracker, or a GPS tracker) associated with an identifier uniquely identifying the additional person. In other words, in this embodiment, the electronic computing device 110 retrieves the identifier uniquely identifying the additional person from the non-visual sensor data obtained from the non-visual sensor 130 and further inserts the identifier uniquely identifying the additional person into the electronic notification. As an example, the electronic computing device 110 may obtain non-visual sensor data indicating presence information directly from a cellular phone operated by the additional person. In this example, the electronic computing device 110 may include an identifier such as a name or phone number identifying the additional person in the electronic notification. If the identity of the additional person cannot be determined, then the electronic notification may indicate that the identity is unknown.

In one embodiment, the electronic computing device 110, in addition to providing an electronic notification indicating the likely presence of an additional person in the FOV depicted by the video data, may re-analyze the video data with another video analytics engine (e.g., a computing device with increased computation capabilities) to confirm the presence of an additional person in the FOV depicted by the video data. In another embodiment, the electronic computing device 110 may retrain the existing video analytics engine using the feedback indicating the likely presence of an additional person in the FOV depicted by the video data.

Turning now to FIG. 5, a flowchart diagram illustrates a process 500 for detecting people in video data using non-visual sensor data. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 213.

The electronic computing device 110 may execute the process 500 at power-on, at some predetermined periodic time period thereafter, in response to a trigger raised locally at the electronic computing device 110 via an internal process or via an input interface or in response to a trigger from an external device (e.g., a computing device associated with an agency) to which the electronic computing device 110 is communicably coupled, among other possibilities. As an example, the electronic computing device 110 is programmed to automatically trigger execution of the process 500 when a request to detect people in video data is received from an agency, for example, via a computing device associated with an agency. As another example, the electronic computing device 110 is programmed to automatically trigger execution of the process 500 when video data captured by a camera 120 has been redacted resulting in the generation of a redacted version of the video data.

The process 500 of FIG. 5 need not be performed in the exact sequence as shown and likewise various blocks may be performed in different order or alternatively in parallel rather than in sequence. The process 500 may be implemented on variations of the system 100 of FIG. 1 as well. The process 500 will be described below with reference to an example user interface 600 shown in FIG. 6. The user interface 600 can be used for presenting an electronic notification 630 indicating the presence of additional persons (i.e., persons who have been overlooked during the redaction process by a human operator or a video analytics engine) in the video data.

At block 510, the electronic computing device 110 obtains a redacted version of video data captured by a camera 120 during a time period. The electronic computing device 110 may obtain a redacted version of video data 610 captured by the camera 120 from a computing device associated with an agency responsible for releasing a redacted version of the video data to the public. As shown in the example illustrated in FIG. 6, the electronic computing device 110 presents the redacted version of video data 610 for playback on a user interface 600. In accordance with some embodiments, the electronic computing device 110 may receive a request for detecting people depicted by the video data 610 from a computing device associated with an agency via the communication network 140. The request may include an identifier that uniquely identifies a redacted version of the video data 610 (e.g., an image or a video). The request may further include one or more of: agency information (e.g., name of agency, location of agency, agency credential etc.) identifying the agency, an identifier of the camera 120 which captured the video data 610, a time period during which the video data was captured by the camera 120, and a location at which the video data 610 was captured by the camera 120, an identifier (e.g., a computer aided dispatch identifier) identifying an incident corresponding to which the video data 610 is captured, location of the incident, type of incident, etc. In some embodiments, the request may additionally include a copy of the video data 610. In other embodiments, the electronic computing device 110 retrieves a redacted version of the video data 410 using the identifier of the video data 610 included in the request by accessing one or more databases which are configured to store video data owned by the agency.

At block 520, the electronic computing device 110 analyzes the redacted version of the video data with a video analytics engine to detect a number of persons who have been redacted from a field-of-view (FOV) depicted by the redacted version of the video data. For example, the video analytics engine may include one or more object or feature classifiers that may be particularly trained to identify an instance of a person or more particularly to identify any segment within the image that reveals redacted portions of facial and/or non-facial features. The electronic computing device 110 may further present an electronic notification identifying a list of persons who were detected to be redacted from the video data by the video analytics engine. In the example shown in FIG. 6, the electronic computing device 110 has analyzed the redacted version of the video data 610 with a video analytics engine to detect the presence of persons 612, 614, 616 in the FOV depicted by the redacted version of the video data 610. In addition, the electronic computing device 110 determines that the person 612 has not been redacted in the FOV depicted by the redacted version of the video data 610. Accordingly, the electronic computing device 110 presents an electronic notification 620 with information 622, 624 indicating that persons 614 and 616 were redacted in the FOV of the video data 610. In addition, since the electronic computing device 110 has determined that the person 612 has not been redacted in the FOV of the video data, the electronic computing device 110 presents an electronic notification 620 with information 626 indicating that person 612 has not been redacted in the FOV of the video data.

At block 530, the electronic computing device 110 obtains non-visual sensor data captured by a non-visual sensor 130 associated with the FOV during the time period. In accordance with some embodiments, the electronic computing device 110 transmits an electronic request to the non-visual sensor 130 to obtain the non-visual sensor data. The electronic request transmitted to the non-visual sensor 130 may include information related to one or more of the time period (i.e., time at which the camera 120 captured the video data), location (location at which the camera 120 captured the video data), and FOV depicted by the video data. The non-visual sensor 130, in response, processes the electronic request and transmits non-visual sensor data captured by the non-visual sensor relative to the time period, location, and FOV of the video data. The electronic computing device 110 is programmed to obtain non-visual sensor data each time a redacted version of video data is generated, for example, by a human operator. Alternatively, the electronic computing device 110 executes block 530 to additionally rely on non-visual sensor data to detect people in video data only when one or more of predetermined conditions, as described below, are satisfied.

In one embodiment, prior to obtaining the non-visual sensor data, the electronic computing device 110 determines whether a measure of video quality of the video data captured by the camera 120 is less than a video quality threshold. For example, the electronic computing device 110 computes a measure of the video quality based on analysis of one or more video features that are extracted from the video captured by the camera 120. The video features that are analyzed include, but not limited to: resolution, camera motion, bad exposure, frame sharpness, out-of-focus detection, brightness (e.g., due to lens flare), overexposure on certain regions of captured image, illumination, noisy frame detection, color temperature, shaking and rotation, blur, edge, scene composition etc. The electronic computing device 110 may compute a measure of video quality based on the combination of one or more analyzed video features. In one embodiment, the video features extracted from the captured video can be quantized and normalized to compute a measure of the video quality with a range of values, for example, between '0' and '10', where the value of '0' indicates a low video quality and the value of '10' indicates a high video quality. In this embodiment, if the measure of video quality is not less than the video quality threshold, then the electronic computing device 110 may not execute block 530 to obtain non-visual sensor data. On the other hand, if the measure of video quality is less than the video quality threshold, then the electronic computing device 110 further obtains non-visual sensor data to determine whether any additional person not redacted in the redacted version of the video data was likely present in the FOV depicted by the video data during the same time period when the video data was captured.

In another embodiment, prior to obtaining the non-visual sensor data, the electronic computing device 110 obtains information regarding environmental and/or weather conditions in relation to the video data captured by the camera 120. In this embodiment, the information obtained regarding environmental and/or weather conditions at a location where the image was captured and further during a time period when the image was captured may indicate that a scene include in the video data may not be sufficiently clear due to one or more of: the scene being dark or the scene being obscured because of smoke, dust, fog, rain, or other environmental or weather factors. In this case, when it is determined that the scene captured in the video data is not sufficiently clear due to the environmental and/or weather conditions existing at a particular location (e.g., location where the camera 120 was deployed) during the time period when the video data was captured, the electronic computing device 110 further obtains non-visual sensor data to determine whether any additional person not redacted in the redacted version of the video data was likely present in the FOV depicted by the video data during the same time period when the video data was captured. The electronic computing device 110 then transmits an electronic request to the non-visual sensor 130 to obtain the non-visual sensor data.

In another embodiment, prior to obtaining the non-visual sensor data, the electronic computing device 110, additionally or alternatively, applies a computer-vision technique to the video data to determine a degree of obscuration of the FOV depicted by the video data captured by the camera 120. If the electronic computing device 110 determines that the degree of obscuration satisfies a predetermined condition, then the electronic computing device 110 transmits an electronic request to the non-visual sensor 130 to obtain the non-visual sensor data.

In another embodiment, prior to obtaining the non-visual sensor data, the electronic computing device 110 obtains additional sensor data captured by one or more of a smoke detector, a fog detector, or a light detector during the time period when the video data was captured by the camera 120. The electronic computing device 110 then determines a degree of obscuration of the FOV based on the additional sensor data. If the degree of obscuration satisfies a predefined condition, then the electronic computing device 110 transmits an electronic request to the non-visual sensor 130 for the non-visual sensor data.

In any case, after the electronic computing device 110 obtains non-visual sensor data that was captured by one or more non-visual sensors 130, the electronic computing device 110 proceeds to block 540 to detect a feature in the non-visual sensor data that indicates that an additional person not redacted in the redacted version of the video data was likely present in the FOV depicted by the video data during the time period. In one embodiment, the electronic computing device 110 may parse the non-visual sensor data such as cellular network logs, Bluetooth beacons, door access logs, presence and movement detectors data, GPS data, or any other source of location data to detect the presence of an additional person (i.e., a person not redacted in the redacted version of the video data) in the FOV depicted by the video data during the time period. As an example, the electronic computing device 110 may parse cellular logs to detect a feature indicating a number of subscriber devices that were operating in the same time period when the video data was captured and further in a region of interest corresponding to the FOV of the video data. In this case, the electronic computing device 110 may compare the number of subscriber devices detected from the cellular logs with the number of persons detected by the video analytics engine as being visible in the FOV depicted by the video data. If the number of subscriber devices detected from the cellular logs is more than the number of persons detected from the video data, then the electronic computing device 110 may determine that an additional person not detected with the video analytics engine was likely present and not redacted in the FOV depicted by the video data during the same time period when the video data was captured by the camera 120. The electronic computing device 110 may similarly parse Bluetooth beacons, presence and movement detectors data, door access logs, GPS data, or any other source of location data to similarly determine that an additional person not detected with the video analytics engine was likely present and further not redacted in the FOV depicted by the video data during the same time period when the video data was captured by the camera 120.

Figure 6:
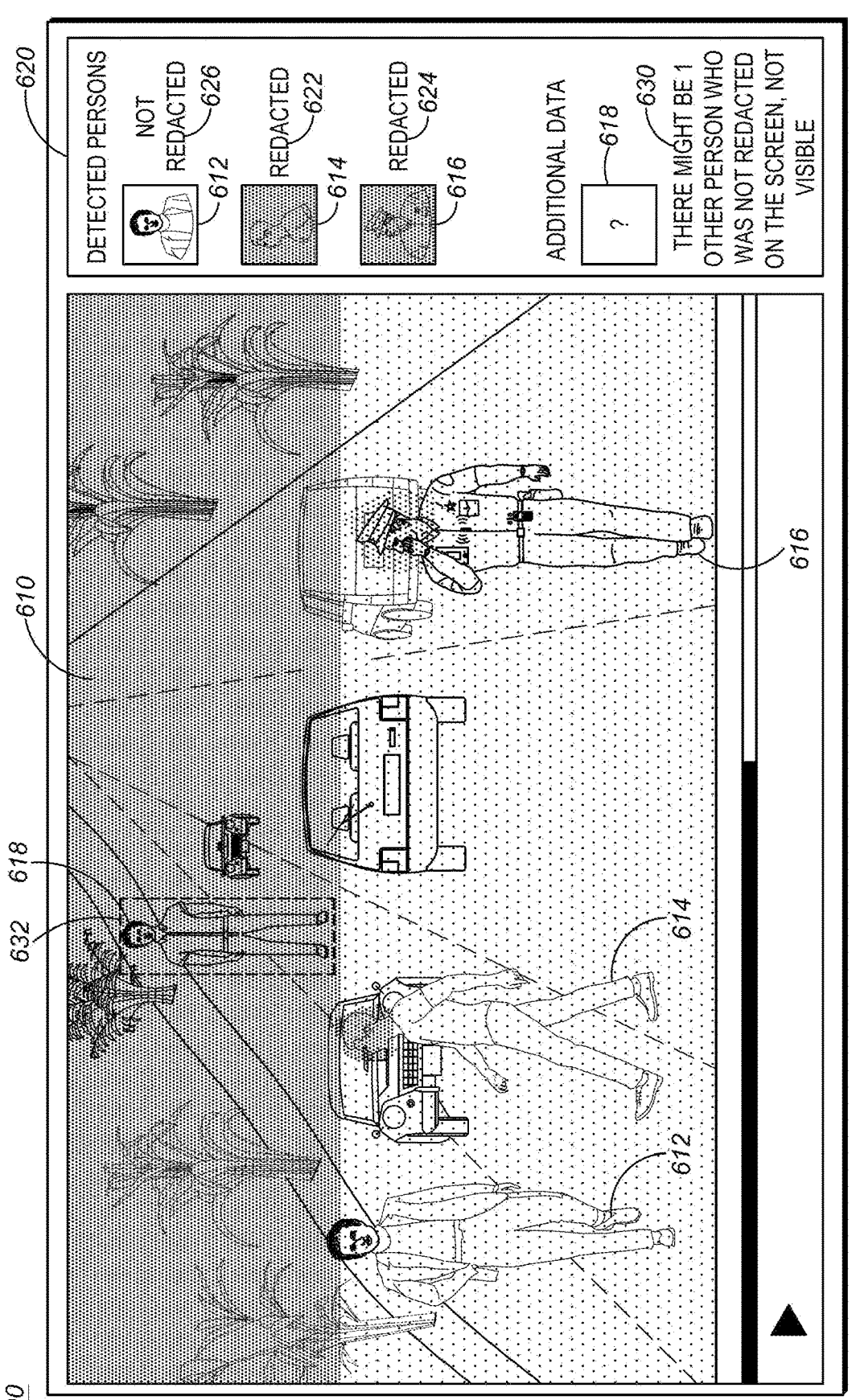
FIG. 6 shows an example user interface for presenting an electronic notification indicating that an additional person not redacted in a redacted version of video data was likely present in a field-of-view depicted by video data.

In the example shown in FIG. 6, the electronic computing device 110 may analyze the non-visual sensor data such as Bluetooth beacons, presence and movement detectors data, door access logs, GPS data, or any other source of location data to detect that an additional person 618 not detected with the video analytics engine and further not redacted in the redacted version of the video data was likely present in the FOV depicted by the redacted version of the video data 410 during the time period. In this example, the video analytics engine (as well as a human operator who performed the redaction of the video data 610) might have overlooked the presence of an additional person 618 in the video data 610 due to the FOV depicted by the video data 610 being covered by dust particles.

Next, at block 550, the electronic computing device 110 provides an electronic notification indicating that an additional person not redacted in the redacted version of the video data was likely present in the FOV depicted by the redacted version of the video data during the time period when the video data was captured. In the example shown in FIG. 6, the electronic computing device 110 presents an electronic notification 630 on the user interface to indicate that there might be an additional person (e.g., person 618 obscured by the dust particles) present on the video data 610 who was not redacted from the video data 610 being played back on the user interface screen. In one embodiment, the electronic computing device 110 identifies a location of the additional person based on the non-visual sensor data, maps the location of the additional person to a pixel range (or frame) of the video data, and further inserts an indication of the pixel range into the electronic notification. In another embodiment, the electronic computing device 110 may render, on an electronic display, an image that illustrates the FOV of the video data 410 as captured by the camera 120 during the time period. In this embodiment, the electronic computing device 110 further renders, on the electronic display, a visual element that identifies the pixel range in the image. For example, as shown in FIG. 4, the electronic computing device 110 renders a visual element 632 by highlighting a pixel range in which the additional unredacted person 618 is likely expected to be present within the image associated with the video data 610.

While the above embodiments have been described herein for detecting people in video data using non-visual sensor data, the embodiments described herein can be similarly implemented for detecting objects (e.g., vehicle, firearm, bag etc.) present in video data (but was not detected with a video analytics engine or a human operator) using non-visual sensor data and for presenting an electronic notification identifying one or more objects not detected with a video analytics engine were likely present in a FOV depicted by video data during the same time period when the video data was captured.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field program-mable gate arrays (FPGAs) and unique stored program instructions (including both software and firmware) that control the one or more processors to implement, in con-junction with certain non-processor circuits, some, most, or all of the functions of the method and/or apparatus described herein. Alternatively, some or all functions could be imple-mented by a state machine that has no stored program instructions, or in one or more application specific integrated circuits (ASICs), in which each function or some combina-tions of certain of the functions are implemented as custom logic. Of course, a combination of the two approaches could be used.

Moreover, an embodiment can be implemented as a computer-readable storage medium having computer read-able code stored thereon for programming a computer (e.g., comprising a processor) to perform a method as described and claimed herein. Any suitable computer-usable or com-puter readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in con-nection with the instruction execution system, apparatus, or device.

Further, it is expected that one of ordinary skill, notwith-standing possibly significant effort and many design choices motivated by, for example, available time, current technol-ogy, and economic considerations, when guided by the concepts and principles disclosed herein will be readily capable of generating such software instructions and pro-grams and ICs with minimal experimentation. For example, computer program code for carrying out operations of various example embodiments may be written in an object oriented programming language such as Java, Smalltalk, C++, Python, or the like. However, the computer program code for carrying out operations of various example embodi-ments may also be written in conventional procedural pro-gramming languages, such as the "C" programming lan-guage or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Inter-net Service Provider).

The Abstract of the Disclosure is provided to allow the reader to quickly ascertain the nature of the technical dis-closure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for detecting people in video data using non-visual sensor data, the method comprising:

receiving, at an electronic computing device, from a camera, video data captured by the camera during a time period;

analyzing, at the electronic computing device, the video data, using an electronic processor executing a video analytics engine comprising an object classifier that is trained to identify an instance of a person depicted in the video data, to detect a number of persons visible in a field of view (FOV) depicted by the video data;

determining, at the electronic computing device, a degree of obscuration of the FOV;

upon determining that the degree of obscuration is above a predefined threshold, transmitting an electronic request from the electronic computing device to a non-visual sensor to provide non-visual sensor data captured by the non-visual sensor data during the time period corresponding to the FOV depicted by the video data;

receiving, at the electronic computing device, from the non-visual sensor, non-visual sensor data that was captured by the non-visual sensor associated with the FOV during the time period;

detecting, at the electronic computing device, a feature in the non-visual sensor data that indicates that an addi-tional person not detected with the video analytics engine was present in the FOV depicted by the video data during the time period; and providing, at the electronic computing device, an elec-tronic notification indicating that an additional person not detected with the video analytics engine was pres-ent in the FOV depicted by the video data during the time period.

2. The method of claim 1, further comprising:

applying a computer-vision technique to the video data to determine the degree of obscuration of the FOV.

3. The method of claim 1, further comprising:

obtaining additional sensor data captured by a smoke detector, a fog detector, or a light detector during the time period;

determining the degree of obscuration of the FOV based on additional sensor data.

4. The method of claim 1, further comprising:

identifying a location of the additional person based on the non-visual sensor data;

mapping the location of the additional person to a pixel range of the video data; and inserting an indication of the pixel range into the elec-tronic notification.

5. The method of claim 4, further comprising:

rendering, on an electronic display, an image that illustrates the FOV as captured by the camera during the time period; and rendering, on the electronic display, a visual element that identifies the pixel range in the image.

6. The method of claim 1, wherein the non-visual sensor comprises at least one of: a Bluetooth Low-Energy (BLE) beacon, a weight sensor, a Global Positioning System (GPS), a Wireless Fidelity (WiFi) Positioning System (WPS), an Ultra-Wideband (UWB) positioning system, a laser perimeter sensor, a radar, a Light Detection and Ranging (LiDar) sensor, a fiber optic detection system, an electrostatic field disturbance sensor, a spot vibration sensor, a passive infrared (PIR) sensor, an active ultrasonic sensor, a temperature sensor, a microwave motion sensor, a window sensor, a door sensor, a capacitive sensor, or a seismic sensor.

7. The method of claim 1, wherein the non-visual sensor is included in an electronic device associated with an identifier uniquely identifying the additional person, the method further comprising:

retrieving the identifier uniquely identifying the additional person from the non-visual sensor data obtained from the non-visual sensor; and inserting the identifier uniquely identifying the additional person into the electronic notification.

8. The method of claim 7, wherein the electronic device is a cellular phone, a Bluetooth tracker, or a Global Positioning System (GPS) tracker.

9. An electronic computing device, comprising:

a communications unit; and an electronic processor communicatively coupled to the communications unit, the electronic processor configured to:

receive, via the communications unit, from a camera, video data captured by the camera during a time period;

analyze, the video data, using an electronic processor executing a video analytics engine comprising an object classifier that is trained to identify an instance of a person depicted in the video data, to detect a number of persons visible in a field of view (FOV) depicted by the video data;

determine a degree of obscuration of the FOV;

transmit, in response to determining that the degree of obscuration is above a predefined condition, an electronic request, via the communications unit, to a non-visual sensor to provide non-visual sensor data captured by the non-visual sensor data during the time period corresponding to the FOV depicted by the video data;

receive, via the communications unit, from the non-visual sensor, non-visual sensor data that was captured by the non-visual sensor associated with the FOV during the time period;

detect a feature in the non-visual sensor data that indicates that an additional person not detected with the video analytics engine was present in the FOV depicted by the video data during the time period; and provide an electronic notification indicating that an additional person not detected with the video analytics engine was present in the FOV depicted by the video data during the time period.

10. The electronic computing device of claim 9, wherein the electronic processor is configured to:

apply a computer-vision technique to the video data to determine the degree of obscuration of the FOV.

11. The electronic computing device of claim 9, wherein the electronic processor is configured to:

obtain additional sensor data captured by a smoke detector, a fog detector, or a light detector during the time period;

determine the degree of obscuration of the FOV based on the additional sensor data.

12. The electronic computing device of claim 9, wherein the electronic processor is configured to:

identify a location of the additional person based on the non-visual sensor data;

map the location of the additional person to a pixel range of the video data; and insert an indication of the pixel range into the electronic notification.

13. The electronic computing device of claim 12, wherein the electronic processor is configured to:

render, on an electronic display, an image that illustrates the FOV as captured by the camera during the time period; and render, on the electronic display, a visual element that identifies the pixel range in the image.

14. The electronic computing device of claim 9, wherein the non-visual sensor comprises at least one of: a Bluetooth Low-Energy (BLE) beacon, a weight sensor, a Global Positioning System (GPS), a Wireless Fidelity (WiFi) Positioning System (WPS), an Ultra-Wideband (UWB) positioning system, a laser perimeter sensor, a radar, a Light Detection and Ranging (LiDar) sensor, a fiber optic detection system, an electrostatic field disturbance sensor, a spot vibration sensor, a passive infrared (PIR) sensor, an active ultrasonic sensor, a temperature sensor, a microwave motion sensor, a window sensor, a door sensor, a capacitive sensor, or a seismic sensor.

15. A method for detecting people in video data using non-visual sensor data, the method comprising:

receiving, at an electronic computing device, from another computing device, a redacted version of video data captured by a camera during a time period;

analyzing, at the electronic computing device, the redacted version of video data, using an electronic processor executing a video analytics engine comprising an object classifier that is trained to identify an instance of a person depicted in the redacted version of video data, to detect a number of persons who have been redacted from a field of view (FOV) depicted by the redacted version of the video data;

determining, at the electronic computing device, a degree of obscuration of the FOV;

upon determining that the degree of obscuration is above a predefined threshold, transmitting an electronic request from the electronic computing device to a non-visual sensor to provide non-visual sensor data captured by the non-visual sensor data during the time period corresponding to the FOV depicted by the video data;

receiving, at the electronic computing device, from the non-visual sensor, non-visual sensor data that was captured by the non-visual sensor associated with the FOV of the redacted version of the video data during the time period;

detecting, at the electronic computing device, a feature in the non-visual sensor data that indicates that an additional person not redacted in the redacted version of the video data was present in the FOV during the time period; and providing, at the electronic computing device, an electronic notification indicating that an additional person not redacted in the redacted version of the video data was present in the FOV during the time period.

16. The method of claim 15, further comprising:

in response to detecting the feature in the non-visual sensor data that indicates the additional person was not redacted in the redacted version of the video data, automatically redacting the additional person from the FOV of the redacted version of the video data.

17. The method of claim 15, further comprising:

applying a computer-vision technique to the video data to determine the degree of obscuration of the FOV.

18. The method of claim 15, further comprising:

obtaining additional sensor data captured by a smoke detector, a fog detector, or a light detector during the time period; and determining the degree of obscuration of the FOV based on additional sensor data.

19. The method of claim 15, further comprising:

identifying a location of the additional person based on the non-visual sensor data;

mapping the location of the additional person to a pixel range of the video data; and inserting an indication of the pixel range into the electronic notification.

20. The method of claim 19, further comprising:

rendering, on an electronic display, an image that illustrates the FOV as captured by the camera during the time period; and rendering, on the electronic display, a visual element that identifies the pixel range in the image.

\* \* \* \* \*